Patented Nov. 17, 1942

2,302,082

UNITED STATES PATENT OFFICE 2,302,082

TREATMENT OF CELLULOSIC YARNS IN THE MANUFACTURE OF TIRE FABRICS AND PRODUCT

William Whitehead, Rye, N. Y., assignor to Celanese Corporation of America, a corporation of Delaware No Drawing. Application July 24, 1940, Serial No. 347,301

8 Claims. (Cl. 154—2)

This invention relates to the treatment of textile yarns, filaments and the like made of cellulosic materials, particularly those made of or containing cotton or regenerated cellulose, in order to improve their properties.

An object of the invention is the treatment of cellulosic yarns or filaments in order to improve their wearing properties.

Another object of this invention is the treatment of yarns or filaments made of or containing cotton or regenerated cellulose so as to render them more suitable in the use of coated material.

A further object of this invention is the production of improved tire cords adapted to be embedded in rubber to form tire fabrics, suitable for use in the production of tires for automobiles and other vehicles, from yarns or filaments of cotton or regenerated cellulose treated with phthalic anhydride.

Other objects and advantages of this invention will appear from the following detailed description.

While this invention is applicable to the production of various plastic coated fabrics wherein the plastic is plasticized cellulose acetate or other derivative of cellulose, resin or rubber, suitable for use in the production of imitation leather, balloon cloth, tire fabrics and the like, it finds its most advantageous use in the production of tire fabrics employed in building rubber tires. Heretofore tire cords of cotton or regenerated cellulose were not satisfactory due to the nature of the surface of such materials resulting in a development of heat at the interface of the rubber and tire cords making for poor adhesion. Another factor which lessened the desirability of cotton or regenerated cellulose tire cords is that the presence of air spaces between the tire cords and the rubber due to poor affinity of the tire cords for the rubber prevented the production of tire fabric wherein there was complete and unbroken union between the rubber and the cords embedded therein. Failure of the rubber and the cotton or regenerated cellulose tire cords to adhere to each other satisfactorily is also due to the difference in the chemical composition of the rubber and the tire cords.

I have now found that the foregoing difficulties may be overcome by treating the yarns or filaments of cotton or regenerated cellulose, as such or in the form of a fabric, with phthalic anhydride in the presence of an organic solvent therefor. This treatment which esterifies the surface of the cotton or regenerated cellulose filaments, i. e., causes the formation of cellulose phthalate at least on the surface thereof, has an unexpectedly beneficial effect on the tire cords. This treatment with phthalic anhydride not only esterifies the surface of the yarns or filaments but also causes the fibers or filaments thereof to have an increased affinity for the rubber causing the tire cords to be embedded in the rubber without the formation of air spaces between the cord and rubber surfaces. The foregoing changes in the nature of the tire cords results in a better union between the tire cords and the rubber applied thereto.

The yarns employed in forming the tire cords may be of cotton or of continuous filaments or staple fibers formed by regenerating cellulose from cellulose acetate or other cellulose derivative capable of being converted to cellulose, such as, for example, cellulose nitrate, cellulose formate, cellulose propionate and cellulose butyrate. Preferably, the yarns employed in accordance with the process of my invention are those formed of regenerated cellulose obtained by stretching cellulose acetate yarns up to 200 to 500% of their original length and then completely saponifying the stretched yarns. Such regenerated cellulose yarns are of increased tenacity and make for better tire cords.

In accordance with my invention the tire cords are prepared by treating the cotton or regenerated cellulose yarns with a solution of phthalic anhydride in acetic acid, with or without a catalyst, for from 1 to 4 hours or longer, and then washing the treated yarns, preferably with hot water, and drying the same. Yarns so treated are smoother and the filaments and fibres thereof have at least a surface of cellulose phthalate.

Five ends of treated 23/1 yarn are plied together and three ends of the five-ply yarn are plied into one end thus producing a tire cord of approximately 3000 denier. The desired number of yarns are arranged in parallel relationship to form a warp sheet, with or without a weft, and passed through a calender where they are coated with rubber to form a tire fabric. Heretofore, it was found necessary to coat the tire cords with latex or similarly acting materials, before passing them through the calender. However, by preparing the tire cords in accordance with my process, this step is no longer necessary. The tire fabric produced from the tire cords in accordance with the present process have greater strength in resisting distortion than tire fabrics heretofore made since there is complete union between the tire cords and the rubber with no air spaces or blisters effecting a separation of the interface.

While a catlyst such as a mixture of zinc chloride and paraformaldehyde, or toluene sulfonic acid and formaldehyde may be employed in my process, a catalyst is unnecessary since the desired degree of esterification may be effected without the use of a catalyst, i. e., from 5 to 20% of phthalyl groups may be added to the cellulose molecule merely by boiling the yarn with a solution of phthalic anhydride in acetic acid.

The following example is one method of carrying out my invention, it being understood that it is given merely by way of example and is to be considered as in no way limitative.

Example

Yarns having a 23/1 count and a twist of approximately 20 turns per inch are formed from stapilized regenerated cellulose. These yarns are refluxed for 4 hours in an acetic acid solution of phthalic anhydride containing 20 parts by weight of the yarn of acetic acid and 5 parts by weight of the yarn of phthalic anhydride. The yarns are then washed with hot water to remove the acetic acid and the excess phthalic anhydride and dried. It was found that the yarns after this treatment had a phthalyl value of 14.8% and were smoother physically. Five ends of the treated yarn are plied together and three ends of the five-ply yarn are plied into one end producing a tire cord having a denier of approximately 3,000.

A number of these yarns are placed in parallel relationship and passed through a calender where rubber is applied thereto to form a tire fabric. This tire fabric is resistant to distortion and there is complete union between the cord fabric and the rubber with no air spaces or blisters effecting a separation of the innerface.

It is to be understood that the foregoing detailed description is given merely by way of illustration and that many variations may be made therein without departing from the spirit of my invention.

Having described my invention, what I desire to secure by Letters Patent is:

1. In a process for the manufacture of tire fabric from cellulosic yarns or filaments wherein a plurality of ends of yarn are plied together to form a tire cord of predetermined denier, said plied yarns are arranged in parallel relationship to form a warp sheet and then said warp sheets are coated with rubber, the step of treating said cellulosic yarns or filaments, prior to the plying operation, with phthalic anhydride to esterify the outer surface only of said yarns or filaments and as a final step subjecting the rubber to vulcanization temperature.

2. In a process for the manufacture of tire fabric from cotton yarns or filaments wherein a plurality of ends of yarn are plied together to form a tire cord of predetermined denier, said plied yarns are arranged in parallel relationship to form a warp sheet and then said warp sheets are coated with rubber, the step of treating said cotton yarns or filaments, prior to the plying operation, with phthalic anhydride to esterify the outer surface only of said yarns or filaments and as a final step subjecting the rubber to vulcanization temperature.

3. In a process for the manufacture of tire fabric, the steps of treating regenerated cellulose yarns, prepared by stretching cellulose ester yarns or filaments and then completely saponifying said stretched yarns or filaments, with a solution of phthalic anhydride in acetic acid to esterify the outer surface only of said yarn, plying together a plurality of ends of the treated yarn to form a tire cord of predetermined denier, arranging said plied yarns in parallel relationship to form a warp sheet, then, without further treatment, coating said warp sheet with rubber to form a tire fabric and subjecting the rubber to vulcanization temperature.

4. In a process for the manufacture of tire fabric, the steps of treating regenerated cellulose yarns, prepared by stretching cellulose acetate yarns or filaments and then completely saponifying said stretched yarns or filaments, with a solution of phthalic anhydride in acetic acid to esterify the outer surface only of said yarn, plying together a plurality of ends of the treated yarn to form a tire cord of predetermined denier, arranging said plied yarns in parallel relationship to form a warp sheet, then, without further treatment, coating said warp sheet with rubber to form a tire fabric and subjecting the rubber to vulcanization temperature.

5. A tire containing a fabric comprising a warp of plied cellulosic yarns the surface only of which comprises cellulose phthalate, said warp being directly coated with vulcanized rubber.

6. A tire containing a fabric comprising a warp of plied cotton yarns the surface only of which comprises cellulose phthalate, said warp being directly coated with vulcanized rubber.

7. A tire containing a fabric comprising a warp of plied superficially phthalated yarns or filaments, said yarns or filaments having a basis of stretched and saponified cellulose ester yarns or filaments, said warp being directly coated with vulcanized rubber.

8. A tire containing a fabric comprising a warp of plied superficially phthalated yarns or filaments, said yarns or filaments having a basis of stretched and saponified cellulose acetate yarns or filaments, said warp being directly coated with vulcanized rubber.

WILLIAM WHITEHEAD.